Aug. 4, 1959    H. SMITH, JR    2,898,448
FLASH GUN
Filed April 10, 1958
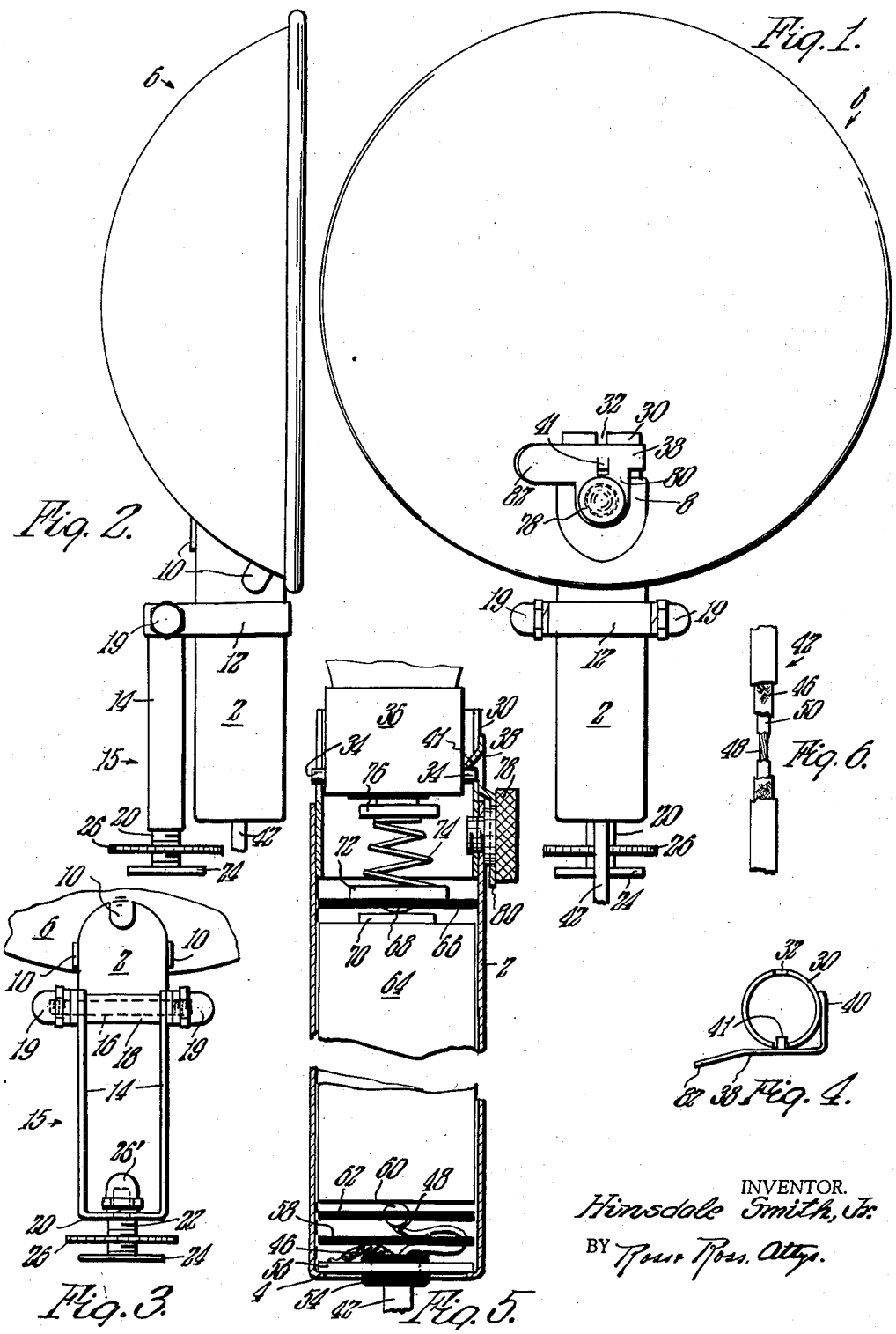
INVENTOR.
Hinsdale Smith, Jr.
BY Ross Ross. Attys.

2,898,448

FLASH GUN

Hinsdale Smith, Jr., Suffield, Conn.

Application April 10, 1958, Serial No. 727,630

2 Claims. (Cl. 240—1.3)

This invention relates to photographic apparatus and is directed more particularly to improvements in flash guns.

The principal objects of the invention are directed to the provision of a flash gun which is self contained, small in size, and light in weight.

According to one novel feature of the invention, the device is arranged for attachment to a camera in easy and ready manner.

According to another feature of the invention, the flash gun is characterized by a novel means for adjustment whereby the reflector thereof may be positioned as desired relative to the lens of the camera to which it is attached.

The flash gun is connectable through a cable to the shutter operating means of a camera to which the gun is attached thereby insuring the energizing of a flash bulb simultaneously with the operation of the camera.

Various changes and modifications may be made in the form of the invention without departing from the spirit and scope thereof, the flash gun for purposes of disclosure being shown in the presently preferred form thereof.

In the drawing:

Fig. 1 is a front elevational view of a flash gun embodying the novel features of the invention;

Fig. 2 is a side elevational view of the flash gun shown in Fig. 1;

Fig. 3 is a rear elevational view of the lower portion of the flash gun shown in Figs. 1 and 2;

Fig. 4 is a plan view of the bulb socket of the flash gun;

Fig. 5 is a longitudinal sectional view of the support of the flash gun; and

Fig. 6 is a plan view of the cable of the flash gun.

Referring now to the drawing in detail, the novel features of the invention will be fully described.

A support 2 is provided which is in the form of a tube having a lower end edge turned inwardly at 4 to provide a lip.

A reflector 6 receives the upper end 8 of the support, and is secured to said support by tabs such as 10 which may be welded to the tube or otherwise secured thereto.

The reflector will have an inner reflecting surface which, for best results, will preferably be brilliant and, as distinguished from a smooth glass-like surface, the same will be somewhat pebbly. It has been found that such a surface reflects more intense light and that same is diffused, and very desirable for photographic purposes. Such may be accomplished in various ways.

A U-shaped strap 12 is secured to the support tube 2, as by welding, or the like, and the side arms 14 of a U-shaped bracket 15 are pivoted at upper ends to the strap by means of a bolt 16. A tube 18 is disposed around the bolt between the arms 14, and nuts 19 on the ends of the bolt clamp the bracket to the strap.

The support and reflector may be adjusted relative to the bracket in any desired relative angular position, and clamped in place by the nuts.

A lower transverse portion 20 of the bracket has a screw 22 secured thereto, and the lower end of said screw carries a plate 24. A nut 26 is in threaded engagement with the screw.

The plate 24 will be of metal, and nut 26 will preferably be formed from Bakelite and same are adapted to engage and secure the bracket to a part of a camera so that the flash gun may be associated with the camera. Cameras are provided with devices, commonly known as accessory clips, to which the bracket may be secured.

A nut 26′ on the upper end of the screw 22 may be loosened so that the bracket may be rotated relative to the axis of the screw to adjusted positions. Thus the reflector may be held in various adjusted positions.

A socket 30 is provided in the upper end of the support. Sockets of various forms may be provided for flash bulbs having bases of various shapes or styles. In the form of the invention being disclosed, said socket is slotted on its opposite sides, as at 32, to receive pins 34 extending from opposite sides of a lamp base 36.

A resilient spring-like retainer 38 has an end 40 secured to the socket 30 in some suitable manner and is provided with an inwardly depending detent 41 to overlie the pin 34 of a lamp base, as in Fig. 5, and releasably hold the lamp base in the socket.

A flexible cable 42 is provided which may be one of the common forms. As shown in Fig. 6, a flexible sheath 44 is formed as a braided metal tube 46. A flexible metallic center member 48 extends through the sheath and is insulated therefrom by a covering 50.

The free end of the cable 42 will be provided with a suitable fitting for connection to the shutter operating mechanism of the camera. As the shutter operating mechanism is operated, the sheath 46 and central member 48 are connected for completing a circuit.

The inner end of the cable extends through an insulating grommet 54 of a metal washer 56 in contact with the support 2. The sheath 46 is electrically connected to the washer 56 by soldering or the like.

The central member 48 of the cable extends through an insulating washer 58 and is secured, as by soldering, to a contact 60 of an insulating washer 62.

A battery is represented by 64, the lower end of which has a lower end or pole in electrical contact with the contact 60.

An upper insulating washer 66 has a contact 68 in engagement with the upper terminal or pole 70 of the battery 64. A part 72 connected to 68 supports a spring 74 which carries a contact for the lower end contact of the base 36.

The grommet 54, and insulating washers 58 and 62, and upper insulating washer 66 are shown in elevation.

The base 36 is in electrical contact with the socket 30 and through the support 2 and washer 56 is connected to the sheath 46 of the cable. The center of the base 36 is connected through members 76, 74 and 68 to the battery 64. The battery 64 is connected to the central member of the cable as previously described. As outer ends of the sheath 46 and central member 48 are engaged by the shutter mechanism of the camera, the bulb is energized.

The socket 30 is releasably secured to the support by a thumb screw 78 extending through a depending portion 80 of the member 38. A manually engageable portion 82 is provided on the member for flexing the member 38 outwardly so that detent 41 will release the base in the lamp socket for ejection of the base of the lamp by the spring 74 which is under compression with the base of a lamp bulb in the socket.

The unit consisting of the components 72, 74 and 76 may be reversed from the position shown, should that be desired, or necessary.

As will be observed, the support 15 may be rotated on the screw 20 to any desired position and secured in place by the nut 26', while the support may be swung to adjusted positions relative to the bracket. Thereby it is possible to obtain any desired position of the reflector relative to the camera to which the flash gun is attached.

Various changes and modifications may be made in the form of the apparatus without departing from the spirit and scope of the invention shown and described in the form thereof at present preferred.

I claim:

1. In flash gun apparatus for attachment to a camera provided with an elongated support in the form of a metallic tube having a metallic socket in contact with the upper end thereof for receiving the base of a flash bulb and an inwardly turned lip at its lower end, the improvement in means for electrically connecting a battery in said tube to the base of a flash bulb in said socket and to a cable having a conducting core and a conducting sheath therearound and insulated therefrom including; a metallic washer in said tube in electrical contact with said lip provided with an insulating grommet, said cable extending through said grommet and said sheath being electrically secured to the upper side of said washer, a lower insulating washer in said tube above said metallic washer and sheath and the core of said cable extending upwardly therethrough, an upper insulating washer in said tube above said lower washer having a contact for contact with the lower end of a battery in said tube above said washer, said core being connected to said contact, integral unit including an insulating washer in said tube for disposition above the upper end of a battery having a metallic member for contact with the upper end of said battery and a metallic compression spring above said uppermost washer having a lower end secured to the metallic member thereof with a metallic contact member fixed to the upper end of said spring for engaging the contact of a bulb base in said socket.

2. In flash gun apparatus having a reflector and means for attachment to a camera provided with an elongated support in the form of a tube having an upper end in said reflector and secured thereto and an inwardly turned lip on the lower end thereof, the improvement in means for electrically connecting a battery in said tube to the base of a flash bulb and to the metallic core and relatively insulated sheath of a cable, a socket in said reflector electrically connected to the upper end of said tube, a metallic washer in said tube in electrical contact with said lip provided with an insulating grommet, said cable extending through said grommet and said sheath being electrically secured to the upper side of said washer, a lower insulating washer in said tube above said metallic washer and sheath and the core of said cable extending upwardly therethrough, an upper insulating washer in said tube above said lower washer having a contact for contact with the lower end of a battery in said tube above said washer, said core being connected to said contact, integral unit including an insulating washer in said tube for disposition above the upper end of a battery having a metallic member for contact with the upper end of said battery and a metallic compression spring above said uppermost washer having a lower end secured to the metallic member thereof with a metallic contact member fixed to the upper end of said spring for engaging the contact of a bulb base in said socket.

References Cited in the file of this patent
UNITED STATES PATENTS

| | | |
|---|---|---|
| 2,293,660 | Nicholas | Aug. 18, 1942 |
| 2,602,879 | Whelan | July 8, 1952 |
| 2,614,471 | Markowitz | Oct. 21, 1952 |
| 2,644,380 | Mendelsohn | July 7, 1953 |